Dec. 10, 1940. J. COTAL 2,224,254
ELECTROMAGNETIC CLUTCHING MECHANISM
Filed Sept. 17, 1938
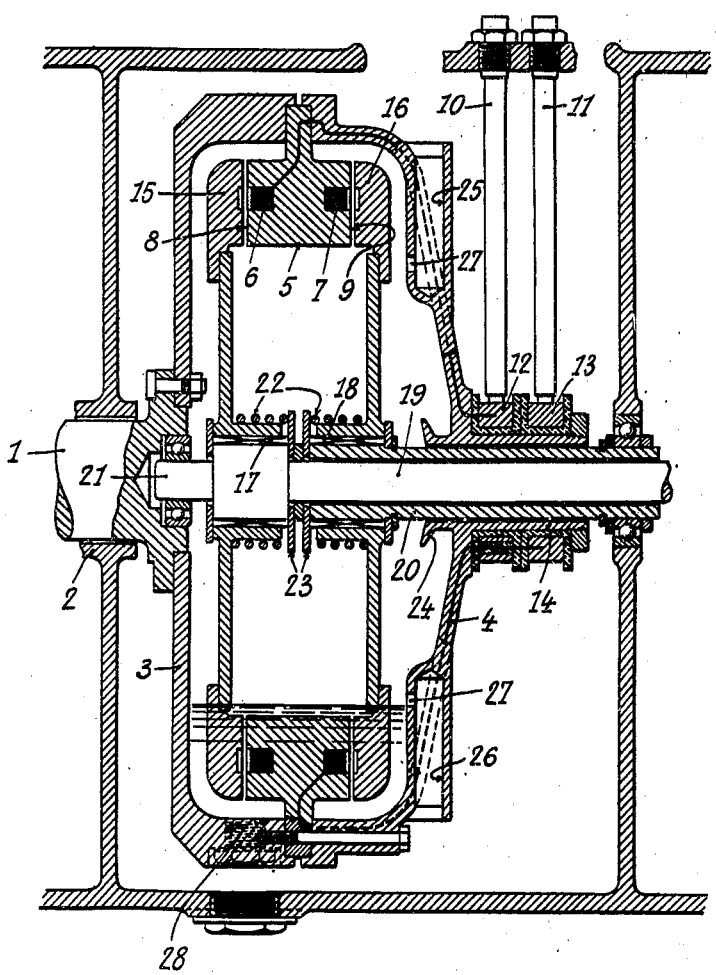
J. Cotal
Inventor
By: Glascock Downing & Seebold
Attys.

Patented Dec. 10, 1940

2,224,254

UNITED STATES PATENT OFFICE 2,224,254

ELECTROMAGNETIC CLUTCHING MECHANISM

Jean Cotal, Paris, France

Application September 17, 1938, Serial No. 230,507
In France September 25, 1937

2 Claims. (Cl. 192—84)

The present invention relates to a mechanism for double electromagnetic clutching which permits of actuating, together or alternately, two concentric shafts each of which drives a receiver apparatus.

According to the invention, the clutching mechanism comprises a double electromagnet having two driving faces, and adjacent each of said faces is located an armature which is connected with one of the driven shafts and which may be connected with the electromagnet by magnetic attraction and returned to the unclutching position by suitable spring means.

According to a further feature of my invention, the entire clutching mechanism is arranged in a tight casing which may serve as a driving flywheel and is secured to the electromagnet.

Other and further features and objects of the invention will be apparent from a consideration of the accompanying drawing and the following description wherein an exemplary embodiment is disclosed.

The single figure of the drawing is an axial sectional view of the clutch mechanism.

In this embodiment, the end of the driving shaft 1, which is supported for instance in a bearing 2, carries a casing consisting of two members 3 and 4, between which is located the ring 5 of an electromagnet. The ring 5 is provided with two windings 6 and 7 and comprises two corresponding driving faces 8 and 9. The current is supplied to these two windings 6 and 7 by two brushes 10 and 11 engaging conducting rings 12 and 13 which are mounted upon a cylindrical extension 14 of the casing member 4 from which they are electrically insulated.

Adjacent the driving face 8 of the electromagnet is mounted an armature 15 and an armature 16 is arranged adjacent the driving face 9. These armatures are connected by sliding couplings 17 and 18, with two respective coaxial driven shafts 19 and 20. The shaft 19 is solid, and its end 21 is supported for example within the end of the driving shaft 1. The second shaft 20 is tubular and is concentric with the shaft 19.

The armatures 15 and 16 are separated from the electromagnet, in the uncoupled position, by springs 22 bearing against abutments such as 23.

The clutching device operates preferably in oil and for this purpose, the members 3 and 4 which provide the casing may form a flywheel mounted in a non-leaking manner on the shaft 20 by means of the cylindrical extension 14 provided with a deflector 24. The casing member 4 is provided with two diametrically opposite radial passages 25 and 26, pierced with orifices 27 for communication with the interior of the casing. The conduit 25 or 26 which may be located at the top will serve for the filling, while the second conduit will serve to regulate the level of the oil by means of its orifice 27. The passages 25 and 26 extend beyond the orifices 27 in order to provide for the deposit of impurities, which are then projected to the exterior by centrifugal force when the apparatus rotates.

The combined casing and flywheel is provided with an emptying plug 28.

The operation is as follows: When the winding 6 is energized, the corresponding armature 15 is attracted and will drive the shaft 19. When the winding 7 is energized, the second armature 16 is attracted, and it effects the clutching of the shaft 20.

Among the uses of this double clutching device, mention may be made of driving receiver apparatus such as a vehicle transmission and the receiver apparatus may be directly coupled to one of the two shafts, 19 for instance, and indirectly to the second shaft by means of a mechanism such as a centrifugal force clutch.

The double electromagnetic clutching mechanism according to the invention provides for the coupling of either of the shafts 19 and 20, simply by the actuation of an electric control device which may depend upon an automatic regulator, such as a speed regulator. In this latter case, as the speed is on one side or the other of a predetermined limit, the current is supplied to the winding 6 or the winding 7, thus coupling the shaft 19 or the shaft 20.

Obviously, the invention is not limited to the embodiment and to the uses hereinbefore specified, which are given solely by way of example.

Having now described my invention what I claim as new and desire to secure by Letters Patent is:

1. In combination a driving shaft, two coaxial driven shafts in line with said driving shaft, one of said driven shafts surrounding the other driven shaft over an intermediate portion between the ends of said other driven shaft, on each of said driven shafts at the end adjacent said driving shaft an armature splined on said driven shaft, a magnetic annular core disposed between said armatures and having two opposite radial faces facing respectively said armatures, two windings each of which is countersunk in one of said radial faces and adapted when carrying electric current to cause the armature facing said radial face to be attracted by said core, a casing secured to said driving shaft and to said core and forming an annular chamber enveloping the outer periphery and the lateral sides of said core and said armatures and adapted to contain oil, spring means adapted to urge said armatures away from said core, and means adapted to supply electric current in said windings selectively and simultaneously, whereby said driven shafts may be driven selectively and simultaneously by said driving shaft at the same speed as said driving shaft.

2. A combination according to claim 1, in which said casing is provided in at least one lateral wall with two diametrically opposite radial bores which are open at their outer end and closed at their inner end and which communicate with said annular chamber shortly before their inner end at a distance from said shafts less than the distance between said shafts and the inner periphery of said annular core.

JEAN COTAL.